US010947882B2

(12) United States Patent
Park (10) Patent No.: US 10,947,882 B2
(45) Date of Patent: Mar. 16, 2021

(54) VEHICLE EXHAUST SYSTEM

(71) Applicants: Hyundai Motor Company, Seoul (KR); Kia Motors Corporation, Seoul (KR)

(72) Inventor: Jung Joo Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/573,558

(22) Filed: Sep. 17, 2019

(65) Prior Publication Data
US 2020/0347768 A1 Nov. 5, 2020

(30) Foreign Application Priority Data
May 2, 2019 (KR) .................. 10-2019-0051354

(51) Int. Cl.
| | | |
|---|---|---|
| *F01N 3/10* | (2006.01) | |
| *F01N 3/28* | (2006.01) | |
| *F01N 9/00* | (2006.01) | |
| *F01N 3/20* | (2006.01) | |
| *F01N 13/10* | (2010.01) | |

(52) U.S. Cl.
CPC ......... *F01N 3/2892* (2013.01); *F01N 3/2006* (2013.01); *F01N 9/00* (2013.01); *F01N 13/10* (2013.01)

(58) Field of Classification Search
CPC ........ F01N 3/2892; F01N 3/2006; F01N 9/00; F01N 13/10; F01N 2240/20; B01F 5/0451

USPC .................................... 60/299, 323, 324
See application file for complete search history.

(56) References Cited

U.S. PATENT DOCUMENTS

| | | | | |
|---|---|---|---|---|
| 4,530,418 A * | 7/1985 | Currie | ................... | F01N 1/08 181/227 |
| 6,311,485 B1 * | 11/2001 | Becker | ............... | B01D 39/2093 422/176 |
| 6,401,449 B1 * | 6/2002 | Hofmann | ............ | B01F 3/04021 60/274 |
| 6,555,070 B1 * | 4/2003 | Kruger | .................. | F01N 3/2853 422/177 |
| 6,840,039 B2 * | 1/2005 | Huh | ........................ | B01F 3/02 60/323 |
| 7,682,578 B2 * | 3/2010 | Zuberi | ................ | B01D 53/944 422/177 |

(Continued)

*Primary Examiner* — Jason D Shanske
(74) *Attorney, Agent, or Firm* — Mintz Levin Cohn Ferris Glovsky and Popeo, P.C.; Peter F. Corless (57) ABSTRACT

A vehicle exhaust system is provided to improve a uniformity index (UI) of exhaust gas discharged through an exhaust manifold. The system includes an exhaust manifold for collecting and transferring exhaust gas discharged from each cylinder of an engine and a catalytic purifier connected to an outlet of the exhaust manifold to reduce harmful substances in the exhaust gas flowing from the exhaust manifold. A mesh member is disposed between the exhaust manifold and the catalytic purifier to allow the exhaust gas to pass therethrough. The mesh member includes partition walls arranged to intersect longitudinally and transversely on an inner passage cross-section through which the exhaust gas passes. The partition walls cause flow resistance while colliding with the exhaust gas to induce the exhaust gas to uniformly flow into a catalyst of the catalytic purifier.

8 Claims, 4 Drawing Sheets

(56) References Cited

U.S. PATENT DOCUMENTS

| | | | | |
|---|---|---|---|---|
| 8,375,708 B2* | 2/2013 | Forster | F01N 3/2892 | 60/324 |
| 8,601,802 B2* | 12/2013 | Yamada | F01N 3/10 | 60/323 |
| 8,650,864 B2* | 2/2014 | Waggoner | F01N 3/046 | 60/298 |
| 9,694,315 B2* | 7/2017 | Hjelmberg | B01D 53/86 | |
| 2002/0116916 A1* | 8/2002 | Hofmann | B01F 5/0451 | 60/282 |
| 2007/0204751 A1* | 9/2007 | Wirth | F01N 3/2066 | 96/290 |
| 2007/0245718 A1* | 10/2007 | Cheng | B01F 3/04049 | 60/286 |
| 2007/0245898 A1* | 10/2007 | Naito | B03C 3/36 | 96/65 |
| 2009/0208393 A1* | 8/2009 | Wenzel | F01N 3/2828 | 423/213.2 |
| 2010/0024404 A1* | 2/2010 | Torkkell | F01N 13/011 | 60/302 |
| 2010/0126156 A1* | 5/2010 | Diez | F01N 13/1805 | 60/323 |
| 2013/0104531 A1* | 5/2013 | Cho | B01F 5/0618 | 60/302 |
| 2014/0069380 A1* | 3/2014 | Leone | F02D 13/0242 | 123/406.12 |
| 2014/0196454 A1* | 7/2014 | Ulrey | F02M 26/10 | 60/605.2 |
| 2014/0196699 A1* | 7/2014 | Ulrey | B60T 17/02 | 123/568.12 |
| 2015/0089923 A1* | 4/2015 | Henderson, IV | F01N 3/28 | 60/274 |
| 2015/0369101 A1* | 12/2015 | Leone | F02D 41/064 | 123/406.12 |
| 2017/0122161 A1* | 5/2017 | Fukami | F01N 5/02 | |
| 2017/0184001 A1* | 6/2017 | Laurell | F01N 3/0814 | |
| 2019/0203626 A1* | 7/2019 | Abhyankar | F01N 3/2066 | |

* cited by examiner

FIG. 1

RELATED ART

VEHICLE EXHAUST SYSTEM

CROSS-REFERENCE TO RELATED APPLICATION

This application claims under 35 U.S.C. § 119(a) the benefit of priority to Korean Patent Application No. 10-2019-0051354 filed on May 2, 2019, the entire contents of which are incorporated herein by reference.

BACKGROUND

(a) Technical Field

The present disclosure relates to a vehicle exhaust system, and more particularly, to a vehicle exhaust system that further improves a uniformity index of exhaust gas discharged through an exhaust manifold from a cylinder of a vehicle engine.

(b) Background Art

In general, a vehicle generates power necessary for driving by burning fuel in an engine. In addition, combustion gas is inevitably produced during the combustion of fuel in the engine, and the combustion gas (exhaust gas) is discharged to the atmosphere through the exhaust system of the vehicle.

In recent years, as interest in the environment has increased, research and technology development for reducing the harmful substances contained in exhaust gas have been actively conducted. In addition, each government has set emission standards for pollutants in exhaust gases such as carbon monoxide (CO), hydrocarbons (HC), and nitrogen oxides (NOx) and regulates the exhaust gases. As a result, vehicle manufacturers are making efforts to effectively cope with the exhaust gas regulations that are being strengthened, and produce new vehicles in accordance with exhaust emission standards.

As is known, the vehicle exhaust system includes an exhaust manifold, an exhaust pipe, and various post-treatment devices installed along the rear end of the exhaust manifold or the exhaust pipe. Among them, the exhaust manifold collects exhaust gas discharged after combustion from a plurality of cylinders provided in the engine, and induces the exhaust gas to flow toward the exhaust pipe. In addition, the post-treatment devices remove various harmful substances contained in exhaust gas while passing the exhaust gas.

Figure 1:
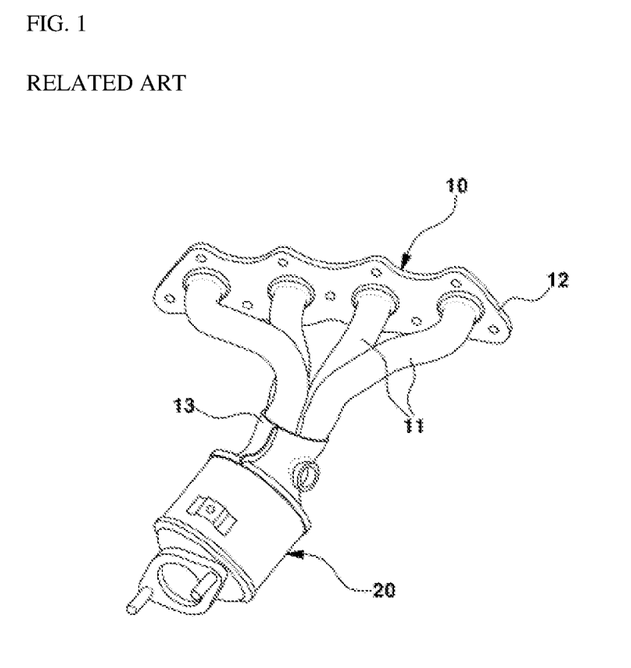
FIG. 1 is a view illustrating an assembled state of a known exhaust manifold and a known catalytic converter according to the related art.

FIG. 1 is a view illustrating an assembled state of a known exhaust manifold and a known catalytic converter according to the related art. As shown in the drawing, the exhaust manifold 10 includes a plurality of runners 11 for inducing the exhaust gas discharged from the cylinder of an engine (not shown) to flow out of the cylinder. In addition, a mounting flange 12 for mounting the exhaust manifold to the cylinder head is disposed at the tips of the runners 11.

A junction portion 13 is disposed at the rear of the runners 11 in the exhaust manifold 10. In particular, the junction portion 13 is a portion where the runners 11 are connected together as one piece. Additionally, the junction portion 13 of the exhaust manifold 10 is a portion where the exhaust gas (combustion gas) guided along the runners 11 after discharge from each cylinder collects. The catalytic converter 20 as a post-treatment device may be connected to the junction portion 13. Thus, the exhaust gas discharged from the cylinders of the engine flows along the runners 11 of the exhaust manifold 10 and joins into one flow at the junction portion 13. Thereafter, the exhaust gas passes through the catalytic purifier, namely, the catalytic converter 20 and then flows along the exhaust pipe (not shown).

Meanwhile, the fluidity of the exhaust gas discharged through the exhaust manifold may also be predicted while being influenced by factors such as a uniformity index, a velocity index, a tangential speed, and a back pressure. Among them, the uniformity index is a quantitative numerical value of how uniformly the exhaust gas flows in the total catalyst area, and is closer to "1" when the same flow rate per unit time is in contact with the total catalyst area. The velocity index is a quantitative numerical value of how much the exhaust gas is eccentric from the catalyst center when it is transferred to the catalyst, and is closer to "1" as it is eccentric from the catalyst center.

In addition, the tangential speed is a rate at which the exhaust gas passes over the ceramic mat surrounding the catalyst. The back pressure is a pressure acting on the flow of exhaust gas, which is a factor that directly affects the engine, and it is advantageous to maintain the back pressure low. Meanwhile, there is a limit to improve the fluidity of exhaust gas due to the limitation of the structure and shape of the exhaust manifold, and a new technique is thus required to further improve the uniformity index.

The above information disclosed in this section is merely for enhancement of understanding of the background of the disclosure and therefore it may contain information that does not form the prior art that is already known in this country to a person of ordinary skill in the art.

SUMMARY

The present disclosure has been made in an effort to solve the above-described problems associated with prior art. In an aspect, the present disclosure provides a vehicle exhaust system capable of further improving a uniformity index (UI) of exhaust gas discharged through an exhaust manifold.

In an exemplary embodiment, a vehicle exhaust system may include an exhaust manifold configured to collect and transfer exhaust gas discharged from each cylinder of an engine, a catalytic purifier connected to an outlet of the exhaust manifold to reduce harmful substances in the exhaust gas flowing from the exhaust manifold, and a mesh member disposed between the exhaust manifold and the catalytic purifier to allow the exhaust gas to pass therethrough and having partition walls arranged to intersect longitudinally and transversely on an inner passage cross-section through which the exhaust gas passes. The partition walls of the mesh member may cause flow resistance while colliding with the exhaust gas to induce the exhaust gas to uniformly flow into a catalyst of the catalytic purifier.

The mesh member may include a ring-shaped ring portion, and the partition walls arranged to intersect longitudinally and transversely in the ring portion and fixedly installed thereto to have a lattice structure. The mesh member may be installed inside a junction portion in which the exhaust gas passes through each runner and then joins in the exhaust manifold, and the partition walls may have the lattice structure in the junction portion.

The partition walls having the lattice structure may be installed upstream and downstream in a flow direction of the exhaust gas to be double-arranged in the ring portion. The upstream partition walls and the downstream partition walls may be alternated with each other in the ring portion. Two mesh members having the ring portion and the partition walls may be double-arranged upstream and downstream in a flow direction of the exhaust gas.

The vehicle exhaust system may further include a controller configured to output a control signal for regulating a back pressure in the catalytic purifier, and a back-pressure regulation valve installed at an exhaust outlet of the catalytic purifier to open and close an outlet passage for regulation of the back pressure. The opening and closing operation of the back-pressure regulation valve being adjusted based on the control signal output by the controller.

The controller may be configured to output a control signal for operating the back-pressure regulation valve to be closed to a predetermined amount of opening of the valve in a catalyst heating (CH) section for catalyst warm-up during cold start of the engine. The controller may also be configured to operate the back-pressure regulation valve to be opened by increasing the amount of opening of the valve with the engine started after completion of the catalyst heating section.

BRIEF DESCRIPTION OF THE DRAWINGS

The above and other features of the present disclosure will now be described in detail with reference to exemplary embodiments thereof illustrated the accompanying drawings which are given hereinbelow by way of illustration only, and thus are not limitative of the present disclosure, and wherein:

FIG. 7 is a flowchart illustrating a process of controlling the back-pressure regulation valve in the exhaust system according to the exemplary embodiment of the present disclosure. It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The present disclosure provides a vehicle exhaust system capable of further improving a uniformity index (UI) of exhaust gas discharged through an exhaust manifold from each cylinder of a vehicle engine. In designing the exhaust manifold of the exhaust system among the components of the engine of the vehicle, an important factor related to the exhaust gas (EM) is a uniformity index (hereinafter, referred to as "UI"). In the exhaust system including the exhaust manifold, the UI of the exhaust gas is improved as the runner length of the exhaust manifold is decreased. In addition, the UI is improved as the junction portion is longer and the back pressure is greater.

The UI is an index indicating the degree to which the exhaust gas is uniformly distributed on the upper surface of the catalyst. The UI is a quantitative numerical value of how uniformly the exhaust gas flows in the total area of the catalyst. As the UI reaches 1, it is improved in terms of the exhaust gas. However, since the exhaust manifold is a sensitive component not only in terms of the exhaust gas (EM) but also in terms of performance and durability, it is necessary to design the exhaust manifold considering various elements together. In particular, the UI and the performance are in a trade-off relationship in terms of aspects other than the UI. In other words, the performance may be increased as the length of the runner is increased, and the increase in the length of the junction portion is limited due to the restriction of the package. In addition, the greater the back pressure, the further improved the UI, but the smaller the back pressure, the greater the performance.

Accordingly, to improve the above-mentioned UI, the present disclosure provides a mesh member installed between the exhaust manifold and the catalytic converter (catalytic purifier) to induce the exhaust gas to be uniformly introduced into the catalyst. In addition, the present disclosure provides a back-pressure regulation valve installed at the rear end of the catalytic converter to increase a back pressure in a catalyst heating (CH) section which is the weakest mode in terms of exhaust gas.

Figure 2:
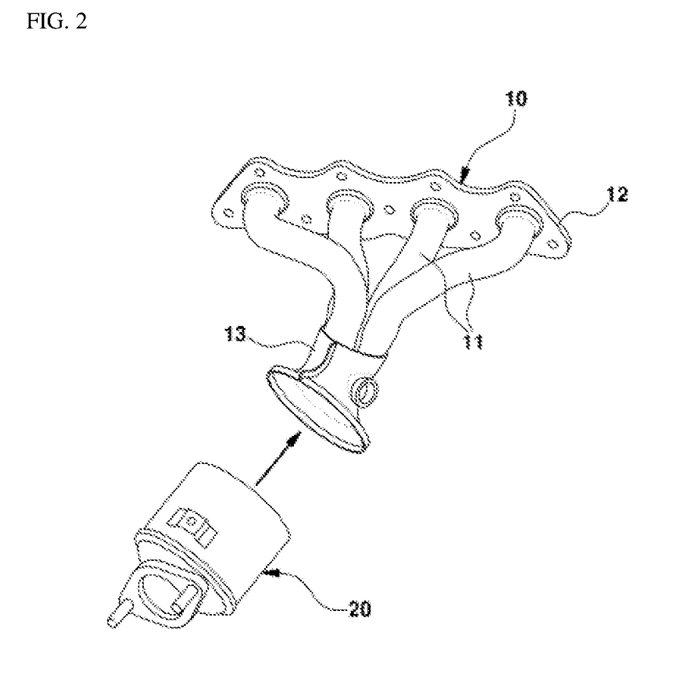
FIG. 2 is a disassembled perspective view of an exhaust manifold and a catalytic converter separated in an exhaust system according to an exemplary embodiment of the present disclosure.
Figure 3:
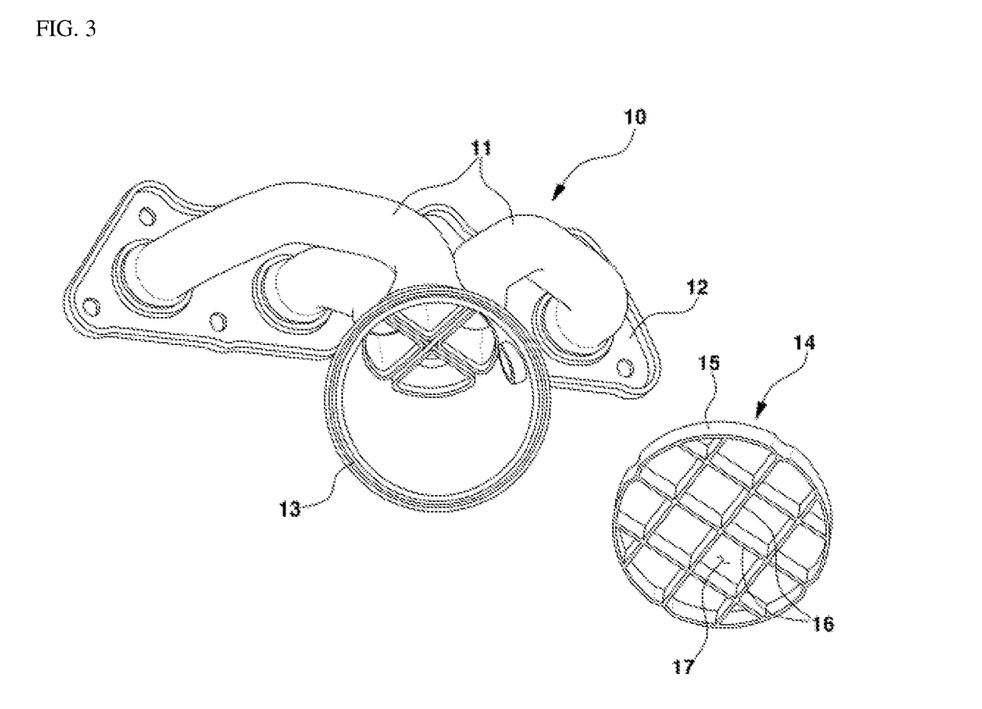
FIG. 3 is a disassembled perspective view of the exhaust manifold and a mesh member in the exhaust system according to the exemplary embodiment of the present disclosure.
Figure 4:
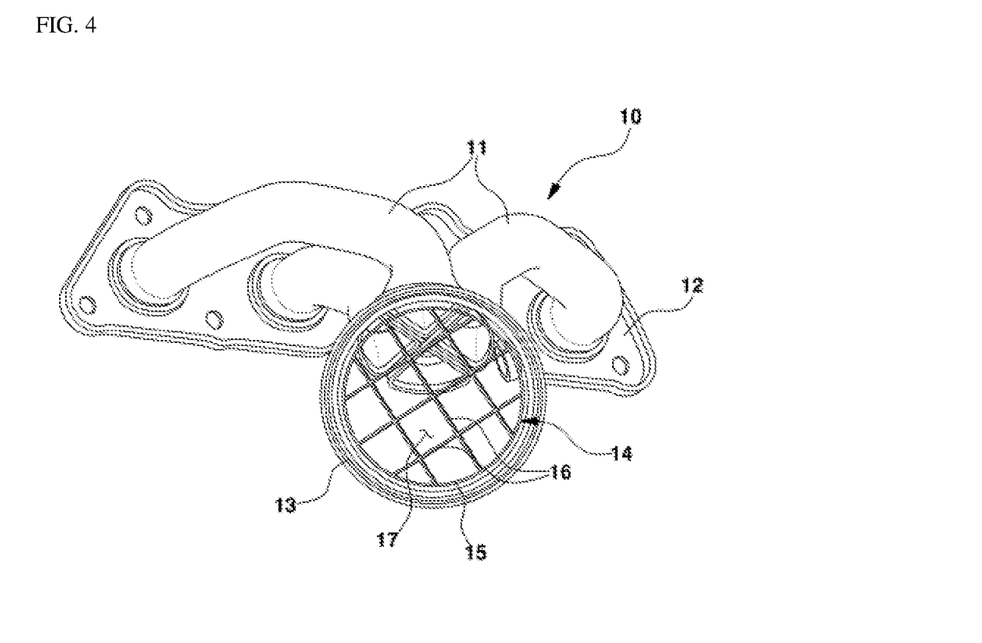
FIG. 4 is an assembled perspective view of the exhaust manifold and the mesh member in the exhaust system according to the exemplary embodiment of the present disclosure.

FIG. 2 is a disassembled perspective view of an exhaust manifold and a catalytic converter separated in an exhaust system according to an exemplary embodiment of the present disclosure. FIG. 3 is a disassembled perspective view of the exhaust manifold and a mesh member in the exhaust system according to the exemplary embodiment of the present disclosure. FIG. 4 is an assembled perspective view of the exhaust manifold and the mesh member in the exhaust system according to the exemplary embodiment of the present disclosure.

Referring to FIG. 2, the exhaust system according to the exemplary embodiment of the present disclosure may include an exhaust manifold 10 and a catalytic converter 20. The exhaust manifold 10 may be configured to collect the exhaust gas discharged after combustion from a plurality of cylinders provided in an engine and transmit and induce the exhaust gas to flow to an exhaust pipe.

As illustrated in the drawings, the exhaust manifold 10 may include a plurality of runners 11 for inducing the exhaust gas discharged from the cylinders of the engine to flow out of the cylinders. A mounting flange 12 may be coupled to the tips of the runners 11 to mount the exhaust manifold on a cylinder head. A junction portion 13 may be disposed at the rear of the runners 11 in the exhaust manifold. The junction portion 13 is a portion where the runners 11 are connected together as one piece. In particular, the junction portion 13 of the exhaust manifold 10 is a portion where the exhaust gas (combustion gas) guided along the runners collects. A catalytic converter 20 as a post-treatment device may be connected to the junction portion 13 which is an outlet of the exhaust manifold 20.

In addition, although not illustrated in the drawings, the exhaust system according to the exemplary embodiment of the present disclosure may further include an exhaust pipe (not shown) connected to the outlet of the catalytic converter 20. The exhaust pipe extends rearward from the engine to guide the exhaust gas to the rear of the vehicle. In addition to the illustrated catalytic converter 20, other post-treatment devices for treating the exhaust gas may be mounted and arranged on the exhaust pipe along an exhaust gas path. Thus, the exhaust gas discharged from each cylinder of the engine flows along the runners 11 of the exhaust manifold 10 and joins into one flow at the junction portion 13. Thereafter, the exhaust gas passes through the catalytic converter 20 and then flows along the exhaust pipe.

Meanwhile, the exhaust system according to the exemplary embodiment of the present disclosure, as shown in FIGS. 3 and 4, may include a mesh member 14 mounted inside the outlet of the junction portion 13 in the exhaust manifold to improve the UI. The outlet of the junction portion 13 in the exhaust manifold 10 is a portion to which the catalytic converter 20 may be connected, and the inlet of the catalytic converter 20 may be connected to the outlet of the junction portion 13 for introduction of the exhaust gas.

Referring to FIG. 2, the inlet of the catalytic converter 20 may be connected to the outlet of the junction portion 13 of the exhaust manifold 10 to dispose the catalytic converter 20 at the rear end of the exhaust manifold 10. Referring to FIGS. 3 and 4, the mesh member 14 may be assembled inside the outlet of the junction portion 13 in the exhaust manifold 10.

In the exemplary embodiment of the present disclosure, the mesh member 14 may be a member in which partition walls 16 are integrally fixed inside a ring-shaped ring portion 15 while intersecting with each other and have a lattice structure inside the ring portion 15. In particular, the mesh member 14 may be coupled to the inside of the outlet of the junction portion 13 to cause the outer peripheral surface of the ring portion 15 to be pressed against the inner peripheral surface of the outlet of the junction portion 13. As a result, the partition walls 16 of the mesh member 14 may be positioned on the passage cross-section of the junction portion 13 through which exhaust gas is collected and passes.

In addition, the inlet of the catalytic converter 20 may be connected to the outlet of the junction portion 13 coupled with the mesh member 14. Thus, the mesh member 14 may be positioned on the exhaust gas path such that the exhaust gas may pass between the junction portion 13 of the exhaust manifold 20 and the catalytic converter 20. In the present disclosure, the mesh member 14 allows the exhaust gas to uniformly flow into the catalytic converter 20, thereby improving the UI.

When the exhaust gas discharged from each cylinder of the engine flows along the runners 11 of the exhaust manifold 10 and joins at the junction portion 13, the joined exhaust gas may pass between the partition walls 16 of the mesh member 14 at the junction portion 13. The exhaust gas having passed through the mesh member 14 may pass the inside of the catalytic converter 20, and then may flow along the exhaust pipe (not shown).

Referring to FIG. 3, each of the ring portion 15 and the partition walls 16 may be made of a plate material having a predetermined thickness in the mesh member 14, and the partition walls 16 may be integrally formed on the inner surface of the ring portion 15 to intersect with each other in the horizontal (transverse) and vertical (longitudinal) directions in the ring portion 15. The space inside the ring portion 15 in the mesh member 14 may be partitioned by the partition walls 16 into a total of 16 (4×4) passage spaces 17 which are four widths by four lengths. In particular, at least the central spaces among the total of 16 passage spaces 17 partitioned by the partition walls (three widths by three lengths) may be rectangular spaces.

Since the mesh member 14 may be installed to the connection portion between the exhaust manifold 10 and the catalytic converter 20 in the present disclosure, the mesh member 14 may be disposed downstream of the exhaust manifold 10 and upstream of the catalytic converter 20 on the path of the exhaust gas. Thus, when the mesh member 14 is mounted upstream of the catalytic converter 20, the exhaust gas may be uniformly introduced into the catalyst.

More specifically, the exhaust gas, discharged from each cylinder of the engine and then flows to the junction portion 13 through each runner 11 of the exhaust manifold 10, passed through the passage spaces 17 between the partition walls 16 of the mesh member 14 before it is introduced into the catalyst of the catalytic converter 20. In particular, the exhaust gas collides with the partition walls 16 of the mesh member 14 to cause flow resistance. As a result, the flow resistance makes it possible for the exhaust gas to exhibit a uniform rate over the entire area of the passage cross-section in the junction portion 13, namely, over the entire area of the mesh member 14.

The mesh member 14 illustrated in FIGS. 3 and 4 is merely an example, and the present disclosure is not limited thereto. In the mesh member 14, the number, direction, and distance of the partition walls 16, and the shapes of the partitioned passage spaces 17 may be modified and changed in various ways. For example, the number of the partition walls 16 of the mesh member 14 may differ from that of the partitioned passage spaces 17.

In the mesh member 14 of FIGS. 3 and 4, three transverse and longitudinal partition walls 16 are disposed to intersect with each other on the passage cross-section through which the exhaust gas passes. Thus, the total of 16 passage spaces 17 which are four widths by four lengths is provided. Unlike the example of FIGS. 3 and 4, by increasing the number of the partition walls 16 and decreasing the distance between the partition walls 16, it may be possible to increase the number of the entire passage spaces 17. Particularly, the gas may be introduced into the catalytic converter 20 at a more uniform rate.

Figure 5:
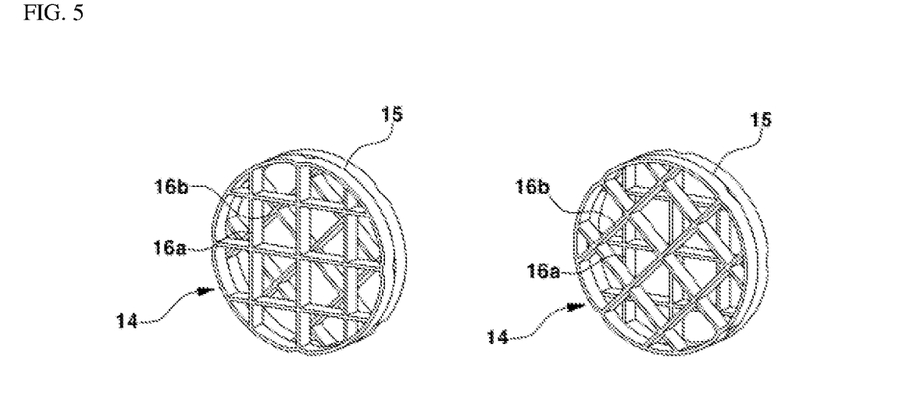
FIG. 5 is a view illustrating another example of the mesh member in the exhaust system according to the exemplary embodiment of the present disclosure.

FIG. 5 illustrates a mesh member 14 in the form of overlapping two mesh members of FIGS. 3 and 4. The mesh member 14 of FIG. 5 may be formed by overlapping two mesh members of FIGS. 3 and 4, in which case ring portions 15 and partition walls 16a and 16b may be separately provided in two mesh members 14. In other words, it may be possible to mount two mesh members between the exhaust manifold 10 and the catalytic converter 20 by manufacturing the mesh members and then alternating the angles of the overlapped partition walls 16a and 16b with each other.

The mesh member 14 of FIG. 5 is in the form of overlapping two mesh members of FIGS. 3 and 4, but the ring portion 15 may be one. In particular, in the mesh member 14 of FIG. 5, only the partition walls 16a and 16b having a lattice structure may be arranged inside one ring portion 15 at the front and rear thereof, that is, they are double-overlapped upstream and downstream in the flow direction of the exhaust gas.

In the exemplary embodiment of the present disclosure, the upstream partition walls 16a and the downstream partition walls 16b may be alternated with each other in the common ring portion 15 such that the angle between them is approximately 45°. Each of the passage spaces 17 partitioned by the partition walls 16a and 16b may have a substantially triangular shape when viewing the mesh member 14 from the front. As illustrated in FIG. 5, when the distance between the partition walls 16a and 16b is reduced and the number of the partition walls and the number of the passage spaces 17 are increased in the mesh member 14, the flow resistance may be greater than that of the mesh member of FIG. 3. Thus, the flow rate of the exhaust gas flowing into the catalytic converter 20 may be more uniform, with the consequence that the effect of improving the UI may be increased.

Figure 6:
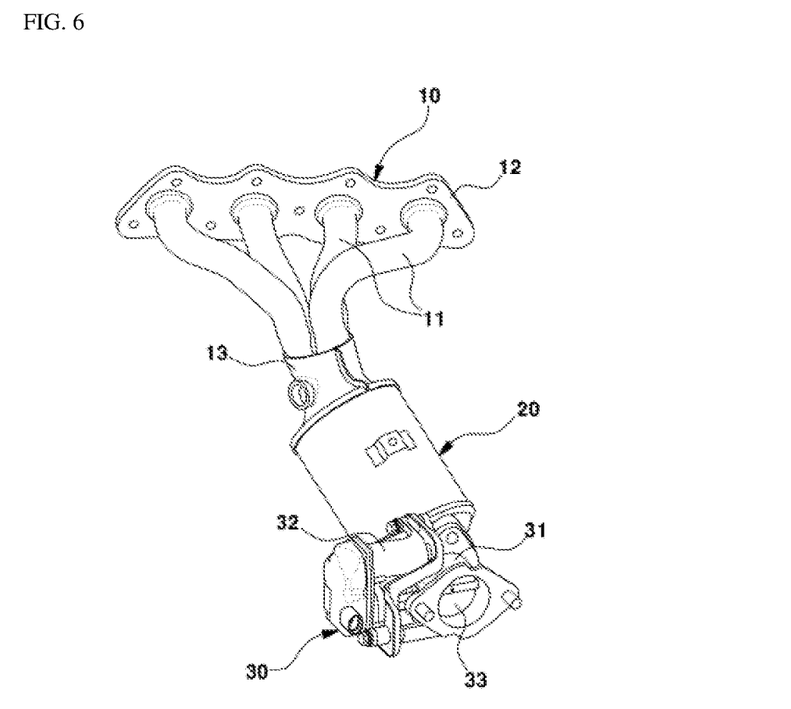
FIG. 6 is a view illustrating a back-pressure regulation valve installed at the outlet of the catalytic converter in the exhaust system according to the exemplary embodiment of the present disclosure.

FIG. 6 is a view illustrating a back-pressure regulation valve installed at the outlet of the catalytic converter in the exhaust system according to the exemplary embodiment of the present disclosure. As illustrated in the drawing, a back-pressure regulation valve 30 may be installed at the exhaust outlet of the catalytic converter 20 to open and close an outlet passage for regulation of the back pressure. In other words, the back-pressure regulation valve 30 may be installed at the outlet of the catalytic converter 20 to provide communication between the outlet of the catalytic converter 20 and the exhaust pipe (not shown) at the rear end thereof by the back-pressure regulation valve 30. The back-pressure regulation valve 30 may be an electronic valve, the opening and closing operation of which may be adjusted by an electrical signal output from a controller 1, namely, a control signal.

In the exemplary embodiment of the present disclosure, the back-pressure regulation valve 30 may be a flap valve and may include a housing 31, an actuator 32 having a motor, and a valve body 33 for opening and closing the passage in the housing 31 while rotating about a shaft by the actuator 32. The housing 31 may be connected between the outlet of the catalytic converter 20 and the exhaust pipe so that the internal space thereof is an exhaust gas passage between the catalytic converter 20 and the exhaust pipe. The plate-shaped valve body 33 may be rotatably mounted on the passage in the housing 31. The valve body 33 may rotate about a shaft connecting the housing 31 in the passage within the housing.

The driving of the motor (not shown) of the actuator 32 may be operated by the controller 1, and the angle of rotation of the motor may be adjusted based on the control signal of the controller 1. Similar to the typical flap valve, the rotational force of the motor shaft may be transmitted to the shaft of the valve body 33 when the motor is driven. Thus, when the driving of the motor is executed based on the control signal of the controller 1, that is, when the angle of rotation of the motor is adjusted, the valve body 33 may be rotated about the shaft in the passage within the housing 31 so that the angle of rotation of the valve body 33 is adjusted. Therefore, it may be possible to adjust the amount of opening of the exhaust gas passage in the housing 31, which is the amount of opening of the valve.

Figure 7:
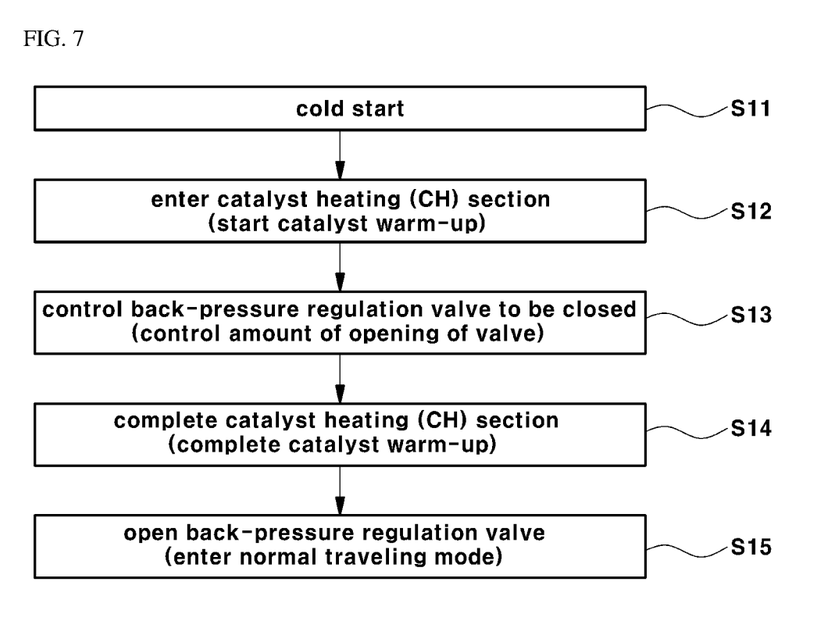

The controller 1 may be an engine control unit (ECU) or an engine management system (EMS) configured to execute operation of the engine. FIG. 7 is a flowchart illustrating a process of controlling the back-pressure regulation valve 30 by the controller 1 in the present disclosure. In the exemplary embodiment of the present disclosure, the controller 1 may be configured to output a control signal for regulating the back pressure in the catalytic converter 20, namely, a control signal for adjusting the opening and closing operation of the back-pressure regulation valve 30, based on the operating state of the engine.

In the exemplary embodiment of the present disclosure, the controller 1 may be configured to operate the back-pressure regulation valve 30 to be closed in the cold start condition of the engine, compared to a normal traveling mode. In particular, as shown in FIG. 7, the controller 1 may be configured to operate the back-pressure regulation valve 30 to be closed in the catalyst heating section after the engine is started, compared to the normal traveling mode.

When the vehicle is started in the cold state of the engine, the catalyst temperature of the catalytic converter is low so that it is difficult to satisfy exhaust gas regulations. Therefore, in a typical vehicle, catalyst heating (CH) control is performed to increase the catalyst temperature to a normal operating temperature to satisfy the regulations. In this regard, the controller 1 of the present disclosure may be configured to determine whether to satisfy a predetermined condition (i.e., cold start condition) and operate the back-pressure regulation valve 30 installed at the outlet of the catalytic converter 20 to be closed while performing the catalyst heating (CH) control (e.g., about 20 to 30 seconds).

Particularly, as illustrated in FIG. 7, the controller may be configured to output a control signal for operating the back-pressure regulation valve 30 to a predetermined amount of opening in the catalyst heating section for catalyst warm-up at the time of engine cold start (S11). The controller 1 may be configured to operate the back-pressure regulation valve 30 to be closed, compared to the normal traveling mode, to improve the UI by increasing the back pressure in the catalyst heating section (S13). In other words, the controller 1 may be configured to output a control signal for adjusting the opening and closing operation of the back-pressure regulation valve 30 to a desired amount of opening set smaller than the normal traveling mode. When the catalyst heating section is completed (S14) after the lapse of the time (e.g., 20 to 30 seconds), that is, when the catalyst warm-up is completed, the controller 1 may be configured to operate the back-pressure regulation valve 30 to be opened by switching to the normal traveling mode (S15).

As described above, in the present disclosure, the back-pressure regulation valve 30 may be closed in the catalyst heating section during the cold start of the engine to increase the back pressure, thereby improving the UI. When the mode is switched to the normal traveling mode after the catalyst heating section is completed, the controller 1 may be configured to output a control signal for adjusting the opening and closing operation of the back-pressure regulation valve 30 to a desired amount of opening determined in advance, to thus open the back-pressure regulation valve.

For example, when the opening ratio of the back-pressure regulation valve 30 under the full open thereof is defined as 100%, the controller 1 may be configured to adjust the opening and closing operation of the back-pressure regulation valve 30 to the opening ratio of 70 to 80% in the catalyst heating section. The amount of opening (opening ratio) of the back-pressure regulation valve 30 during the catalyst heating may be tuned to an appropriate valve in the condition that there is no change in the engine performance through the preliminary test and evaluation process of the engine and exhaust system of the same specification.

As described above since the vehicle exhaust system according to present disclosure installs and uses the mesh member for inducing exhaust gas to uniformly flow into the catalyst and the back-pressure regulation valve for increasing a back pressure in the catalyst heating section, it is possible to maximize the UI. Since the vehicle exhaust system according to the exemplary embodiments of the present disclosure installs and uses the mesh member for inducing exhaust gas to uniformly flow into the catalyst and the back-pressure regulation valve for increasing a back pressure in the catalyst heating section, it may be possible to maximize the uniformity index of the exhaust gas discharged through the exhaust manifold.

The disclosure has been described in detail with reference to exemplary embodiments thereof. However, it will be appreciated by those skilled in the art that changes may be made in these exemplary embodiments without departing from the principles and spirit of the disclosure, the scope of which is defined in the appended claims and their equivalents.

What is claimed is:

1. A vehicle exhaust system, comprising:
   an exhaust manifold for collecting and transferring exhaust gas discharged from each cylinder of an engine;
   a catalytic purifier connected to an outlet of the exhaust manifold to reduce harmful substances in the exhaust gas flowing from the exhaust manifold; and
   a mesh member having a front and a rear disposed between the exhaust manifold and the catalytic purifier to allow the exhaust gas to pass therethrough and having partition walls arranged to intersect longitudinally and transversely on an inner passage cross-section through which the exhaust gas passes,
   wherein the partition walls of the mesh member cause flow resistance while colliding with the exhaust gas to induce the exhaust gas to uniformly flow into a catalyst of the catalytic purifier,
   wherein the mesh member includes:
   a ring-shaped ring portion;
   a first layer of partition walls fixed to an inner circumference of the ring portion and comprising first partition walls arranged to intersect longitudinally and transversely in the ring portion to have a lattice structure and first passage spaces partitioned by the first partition walls; and
   a second layer of partition walls fixed to the inner circumference of the ring portion to adjoin the first layer of partition walls in an axial direction of the ring portion and comprising second partition walls arranged to intersect longitudinally and transversely in the ring portion to have the lattice structure and second passage spaces partitioned by the second partition walls,
   wherein the second layer of partition walls is rotated about the first layer of partition walls by a certain degree such that when viewing the mesh member from the front, the first passage spaces and the second passage spaces have substantially triangular shapes.

2. The vehicle exhaust system of claim 1, wherein the exhaust manifold comprises a plurality of runners defining a passage from each cylinder to the catalytic purifier for the exhaust gas.

3. The vehicle exhaust system of claim 2, wherein the mesh member is installed inside a junction portion connecting the plurality of runners to the catalytic purifier, and the first and second partition walls have the lattice structure in the junction portion.

4. The vehicle exhaust system of claim 1, wherein the ring portion comprises a first ring portion and a second ring portion, the first ring portion and the second ring portion are separate, the first layer of the partition walls is fixed to the first ring portion, and the second layer of the partition walls is fixed to the second ring portion.

5. The vehicle exhaust system of claim 1, further comprising:
   a controller configured to output a control signal for regulating a back pressure in the catalytic purifier; and
   a back-pressure regulation valve installed at an exhaust outlet of the catalytic purifier to open and close an outlet passage for regulation of the back pressure,
   wherein an opening and closing operation of the back-pressure regulation valve is controlled based on the control signal output by the controller.

6. The vehicle exhaust system of claim 5, wherein the controller is configured to output a control signal for operating the back-pressure regulation valve to be closed to a predetermined amount of opening of the valve in a catalyst heating (CH) section for catalyst warm-up during cold start of the engine.

7. The vehicle exhaust system of claim 6, wherein the controller is configured to operate the back-pressure regulation valve to be opened by increasing the amount of opening of the valve with the engine started after completion of the catalyst heating section.

8. A vehicle having a vehicle exhaust system according to claim 1.

* * * * *